(12) United States Patent
Haffner et al.

(10) Patent No.: US 6,731,119 B2
(45) Date of Patent: May 4, 2004

(54) PROXIMITY SENSOR AND METHOD FOR OPERATING A PROXIMITY SENSOR

(75) Inventors: Ken Haffner, Baden (CH); Philippe Pretre, Baden (CH); Oliver Fritz, Baden (CH)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 10/113,158

(22) Filed: Apr. 1, 2002

(65) Prior Publication Data

US 2002/0149376 A1 Oct. 17, 2002

Related U.S. Application Data

(63) Continuation of application No. PCT/CH00/00516, filed on Sep. 25, 2000.

(30) Foreign Application Priority Data

Oct. 1, 1999 (DE) .......................................... 199 47 380

(51) Int. Cl.[7] .............................................. G01R 27/04
(52) U.S. Cl. ...................................... 324/635; 324/654
(58) Field of Search ............................ 324/204, 207.16, 324/207.26, 225, 232, 635, 654; 340/551

(56) References Cited

U.S. PATENT DOCUMENTS

| | | | |
|---|---|---|---|
| 5,519,317 A | | 5/1996 | Guichard et al. ............ 324/336 |
| 5,952,822 A | * | 9/1999 | Kayserman et al. ... 324/207.12 |
| 6,191,580 B1 | * | 2/2001 | Guichard ............... 324/207.26 |
| 6,446,012 B1 | * | 9/2002 | Macke, Sr. et al. ............ 702/22 |
| 6,570,377 B1 | * | 5/2003 | Demma et al. ......... 324/207.26 |
| 2002/0064210 A1 | * | 5/2002 | Sullivan ...................... 375/145 |
| 2002/0149376 A1 | * | 10/2002 | Haffner et al. .............. 324/635 |

FOREIGN PATENT DOCUMENTS

| | | |
|---|---|---|
| DE | 94 12 765.4 U1 | 11/1994 |
| EP | 0 288 921 A2 | 11/1988 |
| EP | 0 316 914 A2 | 5/1989 |
| EP | 1 219 030 B1 | 5/2003 |
| WO | WO 99/04691 | 2/1999 |
| WO | WO 99/05476 | 2/1999 |

OTHER PUBLICATIONS

Henry M. Morris: "Proximity Sensor Makers Keep on Innovating", *Control Engineering*, vol. 40, Dec. 1993, No. 13, pp. 43–45.

\* cited by examiner

*Primary Examiner*—N. Le
*Assistant Examiner*—Walter Benson
(74) *Attorney, Agent, or Firm*—Laurence A. Greenberg; Werner H. Stemer; Ralph E. Locher

(57) ABSTRACT

A proximity sensor, in particular a proximity switch is described. A component that pertains to a system variable and is independent from the material of a trigger or target is elected and transformed into a non-periodic signal that depends upon the distance of the trigger. The trigger of a proximity sensor can thus be exchanged randomly without requiring subsequent adjustments. The impedance of an oscillation circuit which pertains to the proximity sensor, the impedance of an oscillation circuit coil, the amplitude of the oscillation circuit signal or a voltage divider ratio between the oscillation circuit and the additional resistance can be used s system variables for instance.

10 Claims, 3 Drawing Sheets

PROXIMITY SENSOR AND METHOD FOR OPERATING A PROXIMITY SENSOR

CROSS-REFERENCE TO RELATED APPLICATION

This application is a continuation of copending International Application No. PCT/CH00/00516, filed Sep. 25, 2000, which designated the United States.

BACKGROUND OF THE INVENTION

Field of the Invention

The present invention relates to a method of operating a proximity sensor and also a proximity sensor that interacts with an initiator or trigger. The sensor has a tuned circuit and a frequency generator. A component that is independent of the material of the initiator is determined from a complex system variable that depends on a position and the material of the initiator.

Known proximity sensors contain a tuned circuit with a capacitor and a coil, whose impedance changes as a metallic initiator or target approaches. In the case of an inductive proximity sensor, the inductance of the tuned circuit coil is influenced by the initiator, but in the case of a capacitive proximity sensor, it is the capacitance of the tuned circuit capacitor that is influenced. As a result of the change in the impedance of the tuned circuit, an amplitude of the tuned circuit signal changes. The signal is rectified and, in the case of a proximity switch, is converted by a discriminator into a signal indicating the presence or absence of the initiator.

The tuned circuit amplitude depends on the tuned circuit frequency, on the position of the initiator, that is to say its distance from the sensor, and the material of the initiator. In the case of different initiators, the discriminator will generally respond at different switching distances, which is to say at a different distance between the initiator and the sensor. For this reason, commercially available proximity switches are initiator-material specific, and reduction factors in the switching distance are defined. For example, in the case of inductive proximity switches, the switching distance for a copper target is only 30% of the switching distance of a tool steel target, primarily because of the different magnetic properties.

Published, European Patent Application EP 0 288 921 A2 describes an inductive proximity switch which responds at the same switching distance for two different initiator materials. In this case, a differentiation is only made between non-ferrous metals such as copper or aluminium and ferromagnetic ferrous metals. Use is made of the fact that, for a desired switching distance, the impedance/frequency characteristics for the two types of initiator intersect at a point. This point determines both the tuned circuit frequency and the critical tuned circuit impedance to be detected by the discriminator. However, the independence of the initiator is merely ensured for the envisaged switching distance.

German utility model DE 94 12 765 U describes an inductive proximity sensor in which a variable that is substantially independent of the material of the initiator is obtained from a tuned circuit variable and the measured resonant frequency by forming a difference.

SUMMARY OF THE INVENTION

It is accordingly an object of the invention to provide a proximity sensor and a method for operating the proximity sensor which overcome the above-mentioned disadvantages of the prior art methods and devices of this general type, which is independent of the material of an initiator.

With the foregoing and other objects in view there is provided, in accordance with the invention, a method of operating a proximity sensor that interacts with an initiator. The proximity sensor has a tuned circuit and a frequency generator. The method includes determining a component from a complex system variable. The component is independent of a material of the initiator, and the complex system variable depends on a position and the material of the initiator. The determining step includes carrying out a determination of the component in a complex numerical plane by projecting the complex system variable onto a direction perpendicular to a straight line approximating a material dependence of the complex system variable.

The nub of the invention is to split off a component that is independent of the material of the initiator from a complex system variable, which depends on the position and the material of the initiator. The corresponding projection in a complex numerical plane is based on the finding that the dependence of the complex system variable on the material can be approximated by straight lines that are parallel for various initiator positions.

The system variables considered are, for example, the impedance of a tuned circuit belonging to the proximity sensor, the impedance of a tuned circuit coil, the amplitude of the tuned circuit signal or a voltage divider ratio between the tuned circuit and a series resistance.

According to a preferred embodiment of the invention, the aforementioned projection direction is determined numerically or experimentally, by different initiators being brought successively into the same position relative to the proximity sensor, the selected system variable being determined for each initiator and the system variable values determined in this way being linearly interpolated.

According to a further preferred embodiment, in order to reduce the influence of temperature fluctuations on the system variable, a second tuned circuit is provided as a comparative reference.

One advantage of the invention resides in the fact that a continuous signal, dependent only on the position of the initiator, is obtained. In the event of use as a proximity switch, it is therefore possible for the switching distance or if the discriminator threshold to be selected as desired.

In accordance with an added mode of the invention, there is the step of forming the straight line as a linear interpolation to at least two system variable values determined for any desired position of the initiator and different initiator materials.

In accordance with an additional mode of the invention, there is the step of forming the proximity sensor as an inductive proximity sensor and the complex system variable is an impedance of a sensor coil.

In accordance with another mode of the invention, the complex system variable is a tuned circuit impedance, a tuned circuit amplitude or a voltage divider ratio between the tuned circuit and a series resistor.

In accordance with a further mode of the invention, there is the step of forming the complex system variable as a difference between a tuned circuit amplitude or a tuned circuit impedance and a reference amplitude or a reference impedance that is independent of the initiator.

In accordance with a further added mode of the invention, there is the step of using a reference tuned circuit that is identical to the tuned circuit for supplying one of a reference amplitude and a reference impedance.

In accordance with a further additional mode of the invention, there is the step of using an evaluation circuit for converting a periodic signal, that depends on the position and the material of the initiator, a periodic signal of the frequency generator, and a phase angle into a DC signal.

With the foregoing and other objects in view there is provided, in accordance with the invention, a proximity sensor for interacting with an initiator. The sensor includes a tuned circuit, a frequency generator, and an evaluation circuit for determining a component, being independent of a material of the initiator, from a complex system variable being independent of the material and a position of the initiator. The evaluation circuit is connected to the frequency generator and coupled to the tuned circuit. A device is provided for projecting the complex system variable in a complex numerical plane onto a direction perpendicular to a straight line that approximates a material dependence of the complex system variable.

In accordance with a concomitant feature of the invention, the evaluation circuit has a phase shifter, a multiplier connected to the phase shifter, and a low-pass filter connected to the multiplier.

Other features which are considered as characteristic for the invention are set forth in the appended claims.

Although the invention is illustrated and described herein as embodied in a proximity sensor and a method for operating the proximity sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
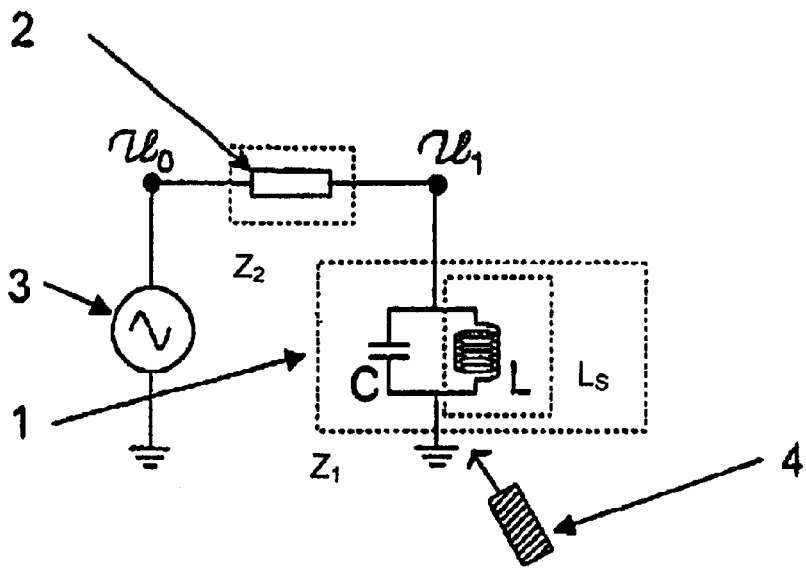
FIG. 1 is a circuit diagram of a proximity sensor according to the invention.
Figure 2:
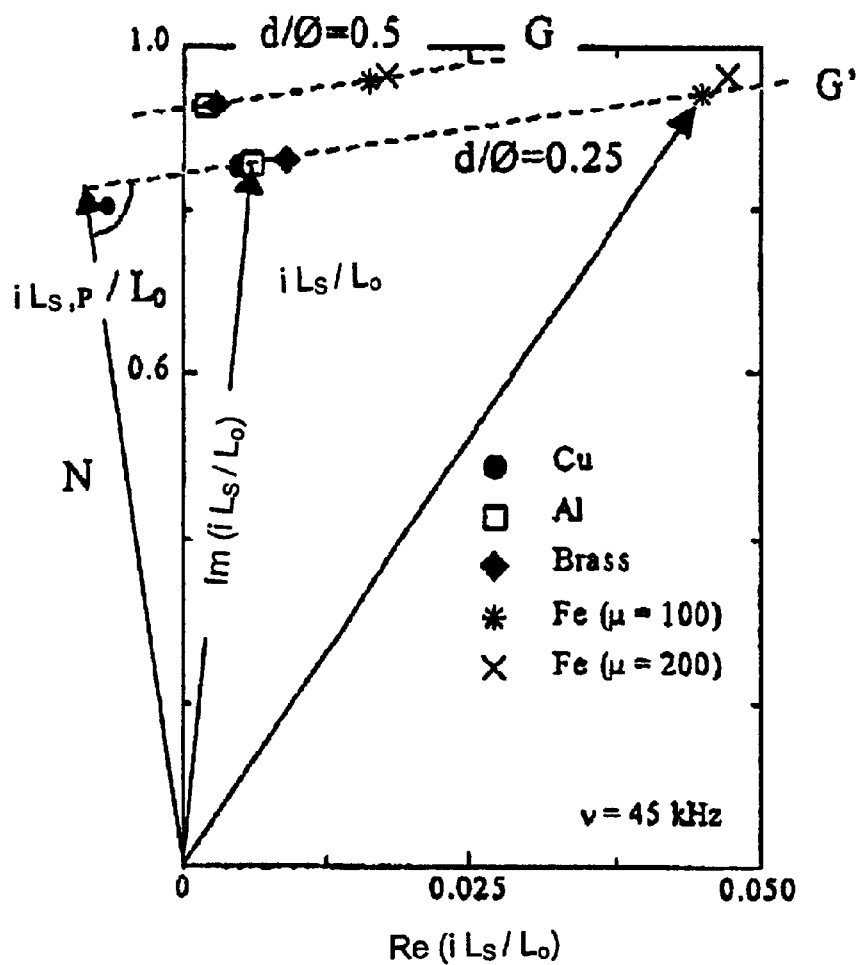
FIG. 2 is a diagram of a complex impedance $L_s$ of a sensor coil of a proximity sensor as a function of an initiator distance and an initiator material.

Elements having the same construction and function are identified by the same reference symbols throughout the figures. Referring now to the figures of the drawing in detail and first, particularly, to FIG. 1 thereof, there is shown basic components of a proximity sensor. A tuned circuit 1 having a capacitor C and a coil L is set oscillating by a frequency generator 3. A series resistor 2 with an impedance $Z_2$ is connected in series with the tuned circuit 1. The complex impedances of the tuned circuit 1 and of the coil L are designated by $Z_1$ and $L_s$. A complex amplitude of the voltage drop across the tuned circuit 1 is $U_1$, and across the tuned circuit 1 and the series resistor 2 is $U_0$. As a result of the approach of an initiator or trigger 4, the impedance of the coil L or of the capacitor C changes, and therefore so does the impedance $Z_1$ of the tuned circuit 1 and the voltage $U_1$. The further description relates to a proximity sensor of an inductive type, in which the coil L is a sensor. FIG. 2 illustrates the coil impedance $L_s$, normalized to the coil impedance in air $L_0$ (in the absence of the initiator 4) for different initiators and initiator positions. The parameters for the latter are set by the ratio d/Ø between an initiator distance d and a coil diameter Ø. The sensor coil diameter of commercially available proximity sensors is a few mm to a few cm, and therefore initiator distances d of the same order of magnitude may be detected. The initiators 4 are distinguished by their electrical conductivity σ and their magnetic permeability μ.

From the illustration in FIG. 2, it can be seen that for the fixed initiator distance d, the coil impedance $L_s$ depends on the material characteristics and therefore also on a temperature T of the initiator 4. The dependence can be approximated by at least approximately parallel straight lines G, G'. Accordingly, a projection $L_{s,p}$ of the coil impedance $L_s$ onto a normal N, which is perpendicular to the straight lines G, G', is independent of the material of the initiator 4. The component $L_{s,p}$ in the direction N of the variable $L_s$ therefore permits material-insensitive determination of the initiator distance d.

Figure 3:
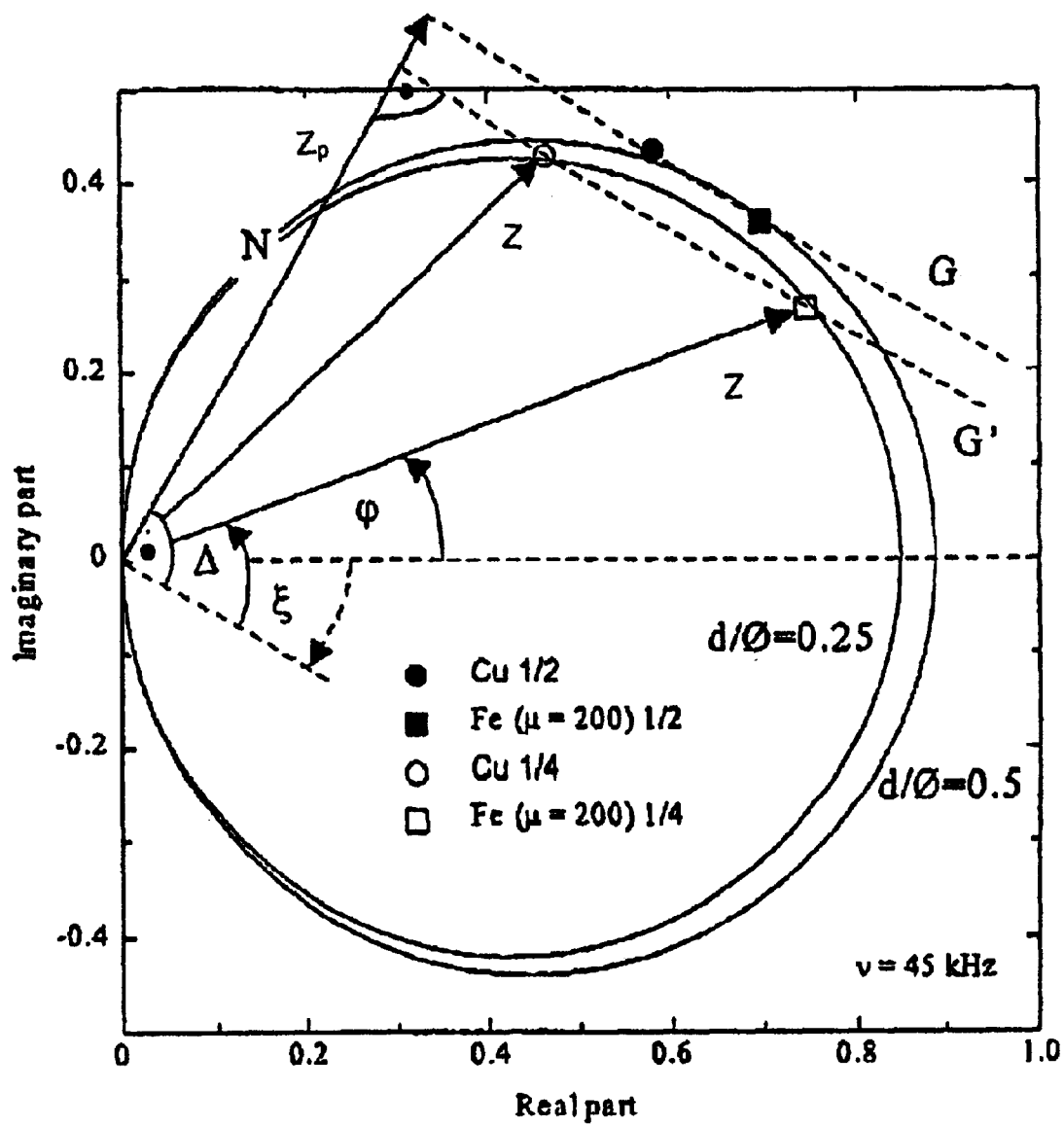
FIG. 3 is a graph of a complex voltage divider ratio Z of the proximity sensor as a function of the initiator distance and the initiator material.

FIG. 3 illustrates another system variable which characterizes a state of the proximity sensor, namely the complex voltage divider ratio $Z=Z_1/(Z_1+Z_2)=U_1/U_0$. Again, the material dependence of Z can be approximated by parallel straight lines G, G'. The parameters of the direction of the straight lines G, G' and therefore the projection direction onto the normal N are set by an angle ξ. The material-independent component of Z parallel to N is designated by $Z_p$. The angle φ corresponds to a phase difference between $U_0$ and $U_1$. The two circles in FIG. 3 reproduce the dependence of the system variable Z on the tuned circuit frequency ν for a respectively fixed initiator distance d. The horizontal line shown dashed, to which the angles ξ and φ relate in the present illustration, in this case corresponds to the resonant frequency of the tuned circuit 1.

It is of course possible for still further stationary complex system variables, such as the tuned circuit impedance $Z_1$, to be evaluated. However, differences between an initiator-sensitive system variable and a reference variable (see FIG. 5 further below) can also be supplied to a tuned circuit analysis. The procedure according to the invention for determining a component that is independent of the initiator material may be applied to any desired system variables and, in practice, contains the following steps. For a fixed tuned circuit frequency ν and any desired distance d, the system variable is determined for at least two different initiators. Here, current and voltage measurements are needed for any impedance determination. The corresponding system variable values are plotted in an illustration corresponding to FIG. 3 and approximated by a straight line G, from which the angle ξ, which depends on the frequency of the tuned circuit, may be determined. During the use of the proximity sensor, the system variable is updated continuously and its projection onto the direction N defined by the angle ξ is evaluated to determine the initiator distance d.

Figure 4:
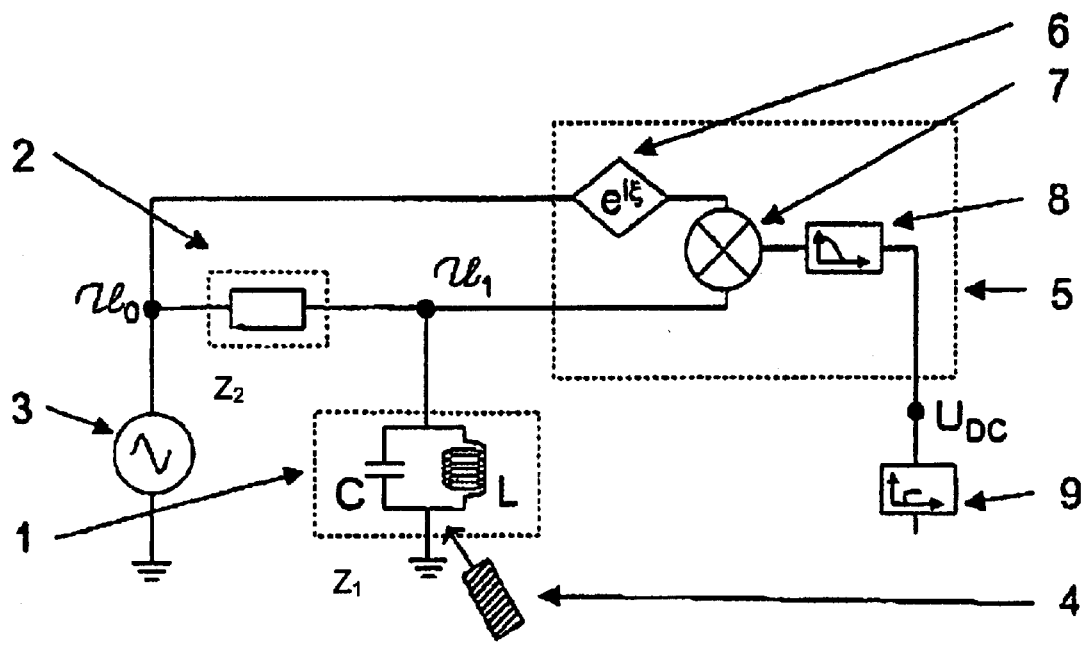
FIG. 4 is a circuit diagram of the proximity sensor with a connected evaluation circuit.

Both the determination of ξ and the projection process during the operation of the proximity sensor can be transferred to a microprocessor by using a plurality of analog-digital converters. The projection according to FIG. 3 can be implemented in measurement terms by a purely analog circuit illustrated in FIG. 4. The periodic voltages $U_0(t)$ and $U_1(t)$ and also the angle $\xi$ are fed to an evaluation circuit 5. A phase shifter 6 shifts the phase of $U_0(t)$ by the phase angle $\xi+\pi/2$. The signals are then multiplied in a multiplier 7 and filtered by a low-pass filter 8. A DC signal $U_{DC}$ is obtained, which is proportional to the magnitude $|Z_p|$ of the projection $Z_p$ sought. All these functions can be carried out by a lock-in amplifier. In the case of a proximity switch, the signal $U_{DC}$ is further supplied to a discriminator 9. The latter converts the signal, depending on a discriminator threshold associated with a specific switching distance, into a binary signal representing the states "initiator present" and "initiator absent".

The functioning of the evaluation circuit 5 may be understood through the following analysis. With $$U_0(t)=Re(U_0 \cdot e^{i\omega t})=U_0 \cdot \cos(\omega t) \text{ and}$$

$$U_1(t)=Re(U_1 \cdot e^{i\omega t})=Re(U_0 \cdot Z \cdot e^{i\omega t})=Re(U_0 \cdot e^{i\omega t} \cdot |Z| \cdot e^{i\omega}).$$

The signal at the output of the multiplier 7 becomes $$U_0^2|Z|\cos(\omega t + \xi + \pi/2) \cdot \cos(\omega t + \varphi) =$$
$$\frac{1}{2}U_0^2|Z|[\cos(2\omega t + \varphi + \xi + \pi/2) + \cos(\varphi - \xi - \pi/2)].$$

After passing through the low-pass filter 8, there remains only a DC term $U_{DC}$ that is proportional to the component $Z_p$ sought, that is to say (with $\Delta=\phi-\xi$):

$$U_{DC} = \frac{1}{2}U_0^2|Z| \cdot \cos(\Delta - \pi/2) = \frac{1}{2}U_0^2 \cdot |Z| \cdot \sin(\Delta) = \frac{1}{2}U_0^2 \cdot |Z_p|.$$

Figure 5:
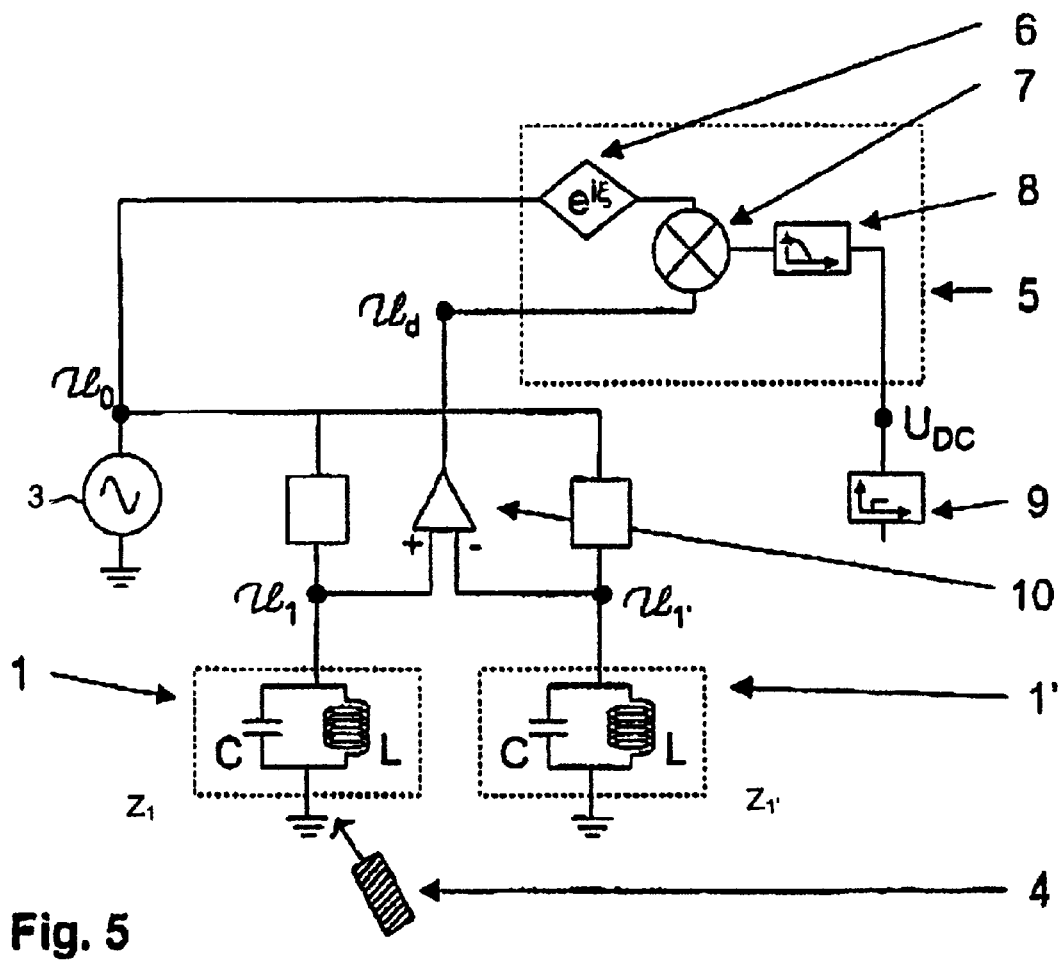
FIG. 5 is circuit diagram of the proximity sensor with a reference tuned circuit.

If the proximity sensor is used in an environment in which the temperature of the sensor varies to a great extent and, as a result, the impedance $Z_1$ of the tuned circuit 1 is influenced, the obvious course is to use a bridge circuit to improve the temperature dependence of the proximity sensor. In FIG. 5, the tuned circuit 1 and an identical reference tuned circuit 1' are disposed at a slight distance for this purpose, in such a way that both are at the same temperature but only one tuned circuit 1 is influenced by the initiator 4. In the embodiment according to FIG. 5, a differentiator 10 generates a difference signal $U_d$ between the tuned circuit amplitude $U_1$ and the initiator-independent reference tuned circuit amplitude $U_{1''}$. However, this solution requires a great deal of space and is costly.

As can be seen from FIGS. 2 and 3, the magnetic permeability $\mu$ forms the dominant material characteristic in distinguishing between the initiator materials. The conductivity $\sigma$ that, for example, distinguishes between the non-magnetic metals copper (Cu), aluminum (Al) and brass, influences the phase and absolute value of the system variable to be determined to a low extent. The component that depends on the initiator material or on the initiator conductivity is obtained by an appropriate projection onto the straight line G. In the case of a fixed initiator distance d, the component can be used for a conductivity comparison and, given a known temperature dependence on the conductivity $\sigma(T)$ of the initiator, can even be used for a measurement of the initiator temperature T. A conductivity or temperature measurement of this type is also virtually decoupled from a variation in the initiator distance d at tuned circuit frequencies that are considerably higher than those selected in FIGS. 2 and 3.

The selection according to the invention of a component of a system variable that is independent of the initiator material results in that in the proximity sensor, the initiator 4 can be replaced as desired without any readjustments being necessary. The proposed projection leads to a non-periodic signal $U_{DC}(d)$ that is dependent on the initiator distance only and which is also suitable for detecting a relative distance change.

We claim:

1. A method of operating a proximity sensor that interacts with an initiator, the proximity sensor having a tuned circuit and a frequency generator, which comprises the steps of:

determining a components, with a real part and an imaginary part, from a complex system variable with a real part and an imaginary part, the component being independent of a material of the initiator, and the complex system variable depends on a position and the material of the initiator, the determining step includes carrying out a determination of the component in a complex numerical plane, with a real part and an imaginary part, by projecting the complex system variable onto a direction perpendicular to a straight line in the complex numerical plane approximating a material dependence of the complex system variable.

2. The method according to claim 1, which comprises forming the straight line in the complex numerical plane as a linear interpolation to at least two system variable values determined for any desired position of the initiator and different initiator materials.

3. The method according to claim 1, which comprises forming the proximity sensor as an inductive proximity sensor and the complex system variable, with the real part and the imaginary part, is an impedance of a sensor coil.

4. The method according to claim 1, which comprises selecting the complex system variable, with the real part and the imaginary part, from the group consisting of a tuned circuit impedance, a tuned circuit amplitude and a voltage divider ratio between the tuned circuit and a series resistor.

5. The method according to claim 1, which comprises forming the complex system variable, with the real part and the imaginary part, as a difference between one of a tuned circuit amplitude and a tuned circuit impedance and one of a reference amplitude and a reference impedance that is independent of the initiator.

6. The method according to claim 5, which comprises using a reference tuned circuit that is identical to the tuned circuit for supplying one of a reference amplitude and a reference impedance.

7. The method according to claim 2, which comprises using an evaluation circuit for converting a periodic signal, that depends on the position and the material of the initiator, a periodic signal of the frequency generator, and a phase angle into a DC signal.

8. A proximity sensor for interacting with an initiator, comprising:

a tuned circuit;

a frequency generator;

an evaluation circuit for determining a component, with a real part and an imaginary part, being independent of a material of the initiator, from a complex system variable, with a real part and an imaginary part, being independent of the material and a position of the initiator, said evaluation circuit connected to said frequency generator and coupled to said tuned circuit; and a device for projecting the complex system variable in a complex numerical plane, with a real part and an imaginary part, onto a direction perpendicular to a straight line in the complex numerical plane that approximates a material dependence of the complex system variable.

9. The proximity sensor according to claim 8, wherein said evaluation circuit has a phase shifter, a multiplier connected to said phase shifter, and a low-pass filter connected to said multiplier.

10. A proximity sensor for interacting with an initiator, comprising:

a tuned circuit;

a frequency generator;

an evaluation circuit for determining a component, with a real part and an imaginary part, being independent of a material of the initiator, from a complex system variable, with a real part and an imaginary part, being independent of the material and a position of the initiator, said evaluation circuit connected to said frequency generator and coupled to said tuned circuit; and means for projecting the complex system variable in a complex numerical plane, with a real part and an imaginary part, onto a direction perpendicular to a straight line in the complex numerical plane that approximates a material dependence of the complex system variable.

* * * * *